Feb. 25, 1969  V. A. ORLANDO  3,430,173

TWO-AXIS ANGULAR DISPLACEMENT DETECTOR

Filed Nov. 17, 1966

INVENTOR.
Vincent A. Orlando
BY
Thomas N. Young
ATTORNEY

United States Patent Office 3,430,173
Patented Feb. 25, 1969

3,430,173
TWO-AXIS ANGULAR DISPLACEMENT DETECTOR
Vincent A. Orlando, Wakefield, Mass., assignor to General Motors Corporation, Detroit, Mich., a corporation of Delaware
Filed Nov. 17, 1966, Ser. No. 595,224
U.S. Cl. 336—79    4 Claims
Int. Cl. H01f 21/04, 21/06

This invention relates to angular displacement detectors and, more particularly, to an inductive device for detectings angular displacement of a body about two intersecting axes wherein the movable portion of the detector includes a conductive ring having no windings mounted thereon.

In a two-axis gyro, a pickoff device is provided to detect angular displacement of the gyro float about two output axes which normally intersect at right angles. If the device is of an inductive nature, the design thereof may require windings to be attached to the float and possibly the connection of leads from a housing to the float. Such apparatus can adversely affect the accuracy of the gyro either by producing mass shifts which unbalance the gyro or by producing torques on the float.

In accordance with the present invention, an inductive pickoff device, suitable for use in a gyro, is provided which eliminates the necessity for conventional float-mounted windings and flexible leads to the float. In accomplishing this, the movable portion of the device is a simple ring of conductive material which may be mechanically connected to the gyro float in any suitable fashion. The ring performs the function of transmitting signals related to its angular position about two intersecting output axes to a fixed member which carries the necessary excitation and output signal windings. An excitation winding induces a current in the ring which produces a toroidal flux pattern about the ring. If the ring is in a reference position, the toroidal flux pattern is so oriented as to induce no voltage in either of a pair of output windings associated with the output or sensitive axes. If, however, the ring is angularly displaced from the reference position, a signal is induced in each winding related to the component of angular displacement of the ring about the axis of the other winding.

Figure 1:
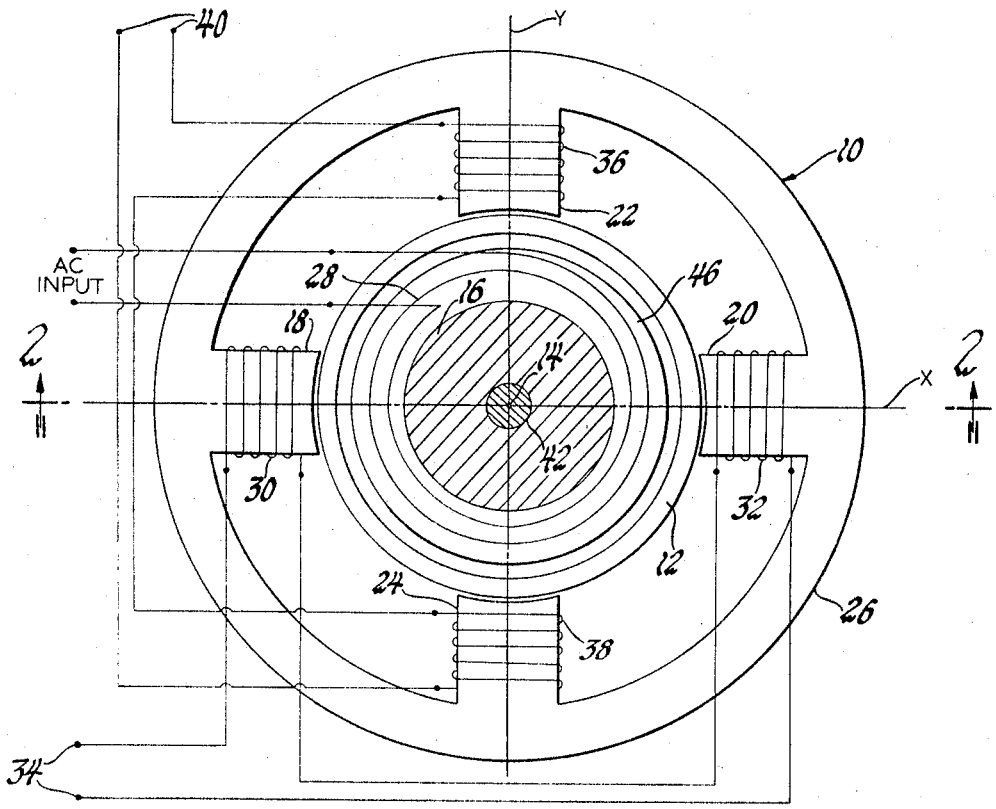
Figure 2:
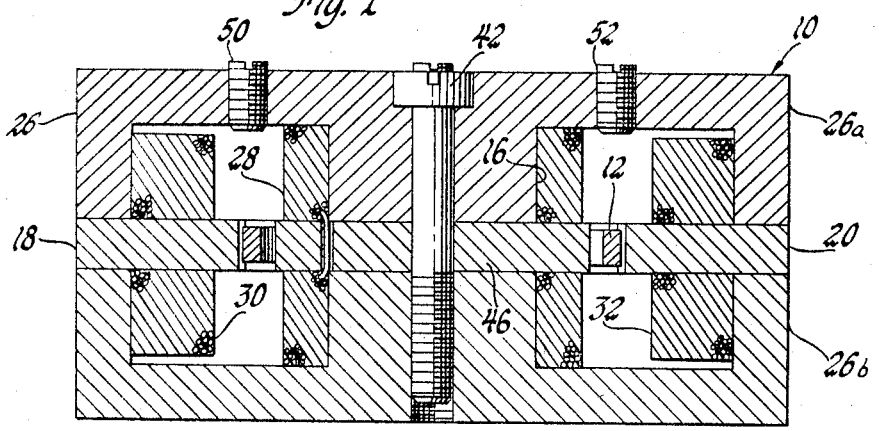

The invention, as well as the construction and operation of a specific embodiment thereof, may be best understood by referring to the following specification which describes the embodiment. This description is to be taken with the accompanying drawings of which:

FIGURE 1 is a schematic illustration of a specific embodiment of the invention; and FIGURE 2 is a sectional view taken along section line 2—2 of the embodiment indicating the specific construction thereof.

Referring to FIGURE 1, the embodiment comprises a fixed member or stator 10 and a movable member or ring 12, both of which have a common axis of symmetry 14. Stator 10, which is made of a magnetically permeable material, comprises a central core portion 16 which is substantially cylindrical in shape and lies along the axis of symmetry 14. Stator 10 further comprises a first pair of radially extending pole pieces 18 and 20 which are located along an output or sensitive axis indicated by X. Pole pieces 18 and 20 are disposed at diametrically opposite positions with respect to core portion 16 and are radially spaced therefrom. A second pair of pole pieces 22 and 24 are disposed along a Y axis and extend radially inward toward diametrically opposite points on core portion 16. The pole pieces 18, 20, 22 and 24 are all substantially coplanar and are interconnected with each other as well as with the core portion 16 by means of a generally annular frame indicated at 26. The X and Y output axes are mutually orthogonal and intersect along the axis of symmetry 14.

An excitation winding 28 is disposed about the core portion 16 and is adapted for connection to an AC voltage source as indicated by the legend in FIGURE 1. Current flow in the winding 28 produces a flux in the core portion 16 substantially parallel to the axis 14. This flux path is completely closed by the outer portion 26 of the stator 10 as best indicated in FIGURE 2.

First and second serially connected output windings 30 and 32 are wound about the pole pieces 18 and 20 respectively and are connected to a first pair of output terminals 34. Similarly, output windings 36 and 38 are wound about the pole pieces 22 and 24 respectively and are connected in series across a second pair of output terminals 40. The pair of output windings 30, 32 and 36, 38 are serially connected in aiding relation such that current flow therein would produce a flux in the same direction and vice versa.

The rotor ring 12 which is made of a conductive metal, such as copper, is disposed about the core portion 16 so as to be radially spaced from the portion 16 and adjacent, but radially spaced from each of the pole pieces 18, 20, 22 and 24. Although omitted from the drawings for the sake of clarity, conductive ring 12 may be mechanically connected to a primary body such as a gyro float such that angular deflection of the primary body cause corresponding angular displacement of the ring 12 about the X and Y output axes.

Describing the operation of the device, the aforementioned angular displacements of ring 12 about the X and Y axes are indicated as explained in the following. The excitation of winding 28 produces a flux in the core portion 16 substantially parallel to axis 14. This flux induces a current in the surrounding conductive ring 12. Current flow in ring 12, in turn, produces a substantially toroidal flux pattern about the ring 12, which, depending upon its orientation, may produce an alternating flux in the pole pieces 18, 20, 22 and 24. If rotor ring 12 is in a reference position wherein it is coplanar with the pole pieces of stator 10, it will be apparent from the drawings that flux from ring 12 intercepts the pole pieces substantially normal to the plane of the pole pieces. This normal flux pattern produces no flux in the pole pieces and thus induces no voltage in any of the output windings 30, 32, 36 or 38. However, if ring 12 is caused to be angularly displaced about the X axis, a component of the MMF caused by the shorted turn alternating current will produce an alternating flux in the magnetic circuit of the Y axis, which includes pole pieces 22 and 24 thus inducing an output voltage in output windings 36 and 38. Similarly, angular displacement of ring 12 about the Y axis produces an output voltage in windings 30 and 32. It will further be appreciated that the frequency of the output voltage will correspond with that of the excitation voltage and further, that the phase of the output voltage as compared with the excitation voltage, depends upon the direction of rotation of ring 12. Therefore, the output voltage sensed across either terminal 34 or 40 or both may be readily phase-compared to the excitation voltage across winding 28 to determine the direction of angular displacement of ring 12 as well as the extent of such displacement and the axis about which the displacement occurred.

As shown in FIGURE 2, the stator 10 may be constructed in two reversely similar sections 26a and 26b which are held together by means of an axial bolt 42. The pole pieces 18, 20, 22 and 24 may be formed integrally with one or the other of the sections 26a and 26b or formed separately as shown. In addition, it may be desirable to place a disc-shaped spacer 46 of magnetic material intermediate the two stator sections 26a and 26b.

The spacer 46 has a diameter which is slightly larger than that of the core section 16 so as to reduce the air gaps between the excitation flux path and the ring 12. Screws 50 and 52 may be threaded into the section 26a for the purpose of adjusting any quadrature flux component in the stator 10.

The foregoing description is intended to illustrate rather than to limit the invention. For a definition of the invention, reference should be taken to the appended claims.

What is claimed is:

1. A two-axis angular displacement detector comprising a fixed member and a movable member, the fixed member including a central core of magnetic material having an axis of symmetry, first and second pole pieces extending radially toward, but spaced from, the core in a plane substantially normal to the axis, the pole pieces being angularly spaced apart to define respective first and second output axes, which intersect on said axis and magnetic means interconnecting the core and pole pieces, an excitation winding disposed about the core and energizable to produce an alternating flux pattern in the core along said axis, first and second output windings disposed about the first and second pole pieces respectively, the movable member comprising a ring of conductive material disposed about the core, spaced from and intermediate the core and pole pieces and adapted for rotation about the output axes, said ring being responsive to current induced therein to produce a toroidal flux pattern which, when the ring is coplanar with the pole pieces induces no output in the output windings, but when noncoplanar induces an output in each of said windings related to the angle of rotation about the other axis.

2. Apparatus as defined in claim 1 wherein the output axes are separated by substantially 90°.

3. Apparatus as defined in claim 1 wherein the fixed member further includes third and fourth pole pieces similar to the first and second pole pieces but diametrically opposite the first and second pieces respectively, said magnetic means interconnecting the third and fourth pole pieces, and third and fourth output windings disposed about the third and fourth pole pieces respectively and connected in series-aiding relation with the first and second output windings, respectively.

4. Apparatus as defined in claim 3 wherein the output axes are separated by substantially 90°.

References Cited

UNITED STATES PATENTS

| | | | |
|---|---|---|---|
| 1,644,789 | 10/1927 | Nordenswan et al. | 336—79 XR |
| 2,700,739 | 1/1955 | Orlando | 336—79 XR |
| 3,101,462 | 8/1963 | Swainson | 336—75 |

LARAMIE E. ASKIN, *Primary Examiner.*

T. J. KOZMA, *Assistant Examiner.*

U.S. Cl. X.R.

336—120